United States Patent
Schneider

(10) Patent No.: US 7,228,371 B2
(45) Date of Patent: Jun. 5, 2007

(54) COMPUTER WORKSTATION AUTOMATED ANALYSIS SYSTEM AND UPGRADE DETERMINATION TOOL

(76) Inventor: John Roger Schneider, 4790 Jasper Rd., Jamestown, OH (US) 45335

( * ) Notice: Subject to any disclaimer, the term of this patent is extended or adjusted under 35 U.S.C. 154(b) by 165 days.

(21) Appl. No.: 10/904,569

(22) Filed: Nov. 16, 2004

(65) Prior Publication Data
US 2006/0112375 A1  May 25, 2006

(51) Int. Cl.
*G06F 1/00* (2006.01)
(52) U.S. Cl. .................. 710/104; 709/224; 709/223; 709/201; 717/131
(58) Field of Classification Search ........ 709/220–226, 709/201–203, 245–250; 710/104–106; 717/131
See application file for complete search history.

(56) References Cited

U.S. PATENT DOCUMENTS

| | | | | |
|---|---|---|---|---|
| 5,958,010 | A * | 9/1999 | Agarwal et al. ............. | 709/224 |
| 6,125,390 | A * | 9/2000 | Touboul ...................... | 709/223 |
| 6,453,413 | B1 * | 9/2002 | Chen et al. ..................... | 713/2 |
| 6,714,976 | B1 * | 3/2004 | Wilson et al. .............. | 709/224 |
| 6,792,455 | B1 * | 9/2004 | DeLuca et al. .............. | 709/224 |
| 6,850,530 | B1 * | 2/2005 | Waclawsky et al. ......... | 370/401 |
| 6,892,236 | B1 * | 5/2005 | Conrad et al. .............. | 709/224 |
| 2003/0229890 | A1 * | 12/2003 | Lau et al. .................... | 717/168 |
| 2005/0107997 | A1 * | 5/2005 | Watts et al. .................. | 703/21 |
| 2005/0268147 | A1 * | 12/2005 | Yamamoto et al. ............ | 714/2 |
| 2006/0004767 | A1 * | 1/2006 | Diaconu et al. .............. | 707/10 |

\* cited by examiner

*Primary Examiner*—Khanh Dang
*Assistant Examiner*—Raymond N Phan

(57) ABSTRACT

A configurable computer resource usage system for collecting hardware and software usage from computer systems with various operating systems, aggregating and filtering the data, transferring it to a centralized computer system, and performing analysis to determine if a hardware or software upgrade is needed. A computer software product that executes on a client computer workstation and collects performance data relevant to that specific machine and data indicating the versions of software and hardware components installed on that machine. A centralized computer that receives the performance and versioning data, stores it, aggregates it with other static data, and performs analysis to determine if the client computer is an upgrade candidate. A graphical user interface displaying the analysis and relevant summarized data is provided through one of several methods, including a web browser accessing the data over the Internet or LAN or WAN.

7 Claims, 9 Drawing Sheets

COMPUTER WORKSTATION AUTOMATED ANALYSIS SYSTEM AND UPGRADE DETERMINATION TOOL

FIELD OF THE INVENTION

The present invention relates to determining the usage of a plurality of computer systems, analyzing the usage, and on-demand viewing of the analysis to determine if an upgrade is warranted.

RELATED ART

Computer system networks typically have many workstations (PCs or laptops) attached and running on them, possibly using different operating systems. The workstations will be configured with different hardware and software components depending on several items, including when the workstation was purchased, the expected type of usage of the workstation, and the amount of capital available for the initial purchase.

Management of computer workstation resource usage is typically not done due to the complexities involved. Instead, computer workstations are usually managed through a replacement cycle process. The standard cycle is usually to replace a computer workstation with an entirely new machine every three years. There is no solution that allows for effectively determining usage of a workstation and analyzing if that usage constitutes the need for a complete replacement, an upgrade of a hardware component (e.g. memory) or software component (e.g. operating system), or no action at all.

Conventional computer resource usage monitoring systems are typically designed and used on computer servers to examine and report on shared resources. Servers are designed to run 24 hours a day every day, are permanently connected to the network, and are usually monitored consistently over that time period to determine potential performance problems. Conversely, computer workstations are typically used only during normal working days and hours, may be connected and disconnected from the network frequently, and are much more likely to have non-homogeneous software and hardware components. This makes it difficult to determine what level of usage the computer workstation experiences.

Typical computer resource usage monitoring systems are designed and used to monitor whether computer systems, or modules within the computer system, have failed. This has limited use, as a failure usually prompts the user of the system to notify someone of the problem. Conventional monitoring systems are also designed to be continually running and are expected to be present on the system being monitored throughout that system's life-time. This continuous monitoring, especially when aggregated over time, can use a significant portion of the computer systems' resources, itself becoming a resource drain.

Conventional computer resource usage monitoring systems only contain a subset of the functionality required to monitor a plurality of computer workstations. Conventional systems do not contain software distribution system functionality and do not have the functionality to configure each workstation's monitoring parameters individually. Typically, software distribution of monitoring agents is a manual process or must be performed through a separate system not directly integrated with the computer resource usage monitoring system. This leads to either a manually intensive process, or a significant integration effort of disparate systems.

Conventional computer resource usage monitoring systems will typically only provide raw data or graphs indicating resource usage over a period of time. It is still left up to a user of the system to determine if those levels of resource usage constitute a need to take any action. No computer resource usage monitoring system automatically performs an analysis comparing raw performance data combined with computer hardware and software component version data, with known performance limits of those hardware and software component combinations. It is especially integral to be able to perform this analysis pertaining to computer workstation resource usage, as there are typically significant variations in hardware and software configurations across an organization.

Determining workstation usage is important. A workstation may not be being utilized at levels that would require a hardware upgrade, but may be replaced anyway as part of the normal 3-year cycle. This results in unnecessary capital expenditure. Equally possible after analyzing workstation usage is determining, prior to the normal upgrade cycle, that a computer workstation hardware upgrade is necessary to increase a user's productivity. If the need to upgrade is not discovered until the normal 3 year upgrade time, a user's productivity may be severely negatively impacted.

Likewise, it is important to determine the effect that a proposed operating system upgrade may have on the performance of a computer workstation. Installing a new operating system or upgrading to a new version can possibly increase performance as well as possibly decrease performance of workstation resources. Without a method and system to analyze the effects that an operating system change may have on workstation resource usage, it is difficult to determine if a hardware upgrade is required at the same time as the operating system upgrade.

SUMMARY OF THE INVENTION

A computer workstation resource usage monitoring and analysis system is provided.

The usage system consists of software that collects data about computer workstation usage and its various hardware/software components. It also consists of configuration files that indicate when to attempt data collection, what type of data to collect, and how to communicate the data back to a centralized computer system. The usage system also includes software to communicate the data back to the centralized computer system through various means, including SMTP, HTTP, as well as other protocols that allow for data delivery.

The centralized computer system stores and aggregates the resource usage data and component data from computer workstations. It also houses data pertaining to known hardware and software performance based on specific hardware/software configurations. When enough data is collected from a computer workstation and is stored in the centralized computer system, an automated analysis is executed at the centralized system to determine if the usage of the workstation requires a hardware or software upgrade, including the need to possibly replace the entire workstation.

A graphical user interface then presents the upgrade analysis results to the user. This interface may be through the Internet and viewed using a web browser, or it may be any other type of software capable of like display over any type of communication platform (LAN, WAN, or the like).

Reports, showing multiple workstation analysis and other aggregated data, are generated and viewable through the same means.

DETAILED DESCRIPTION OF THE PREFERRED EMBODIMENTS

Figure 1:
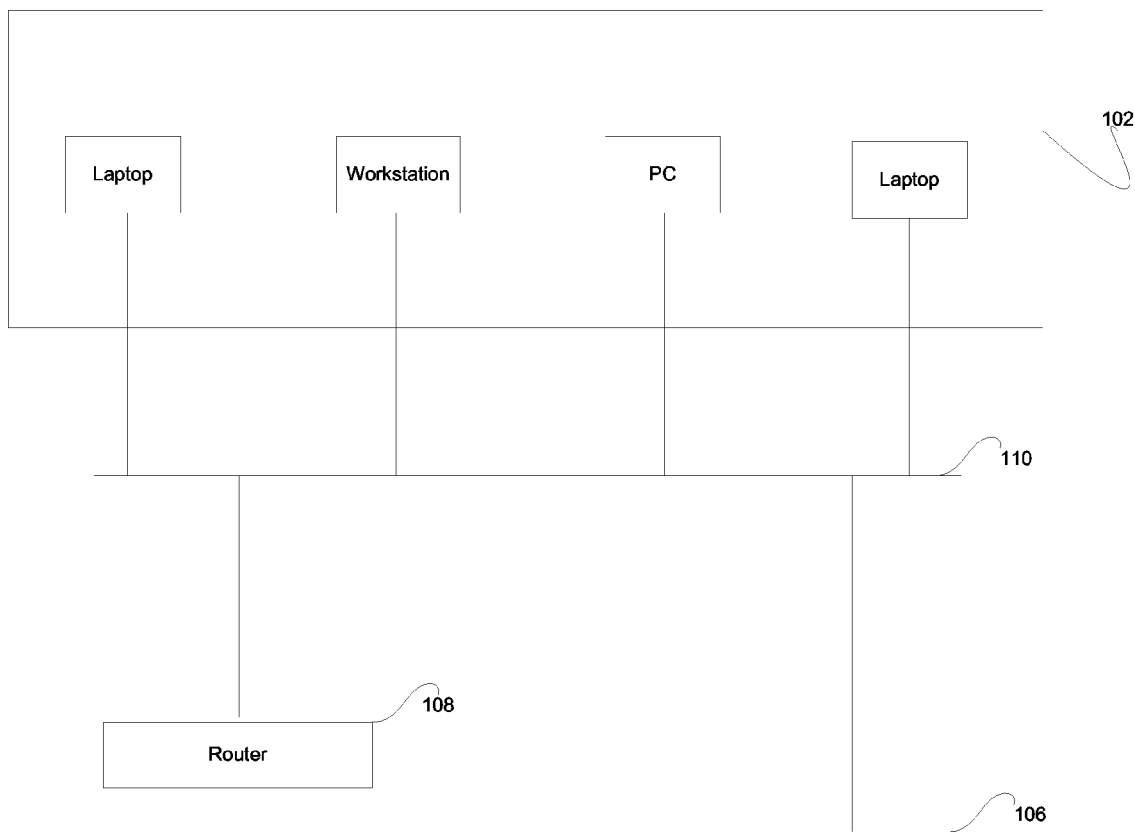
FIG. 1 is a block diagram that illustrates a computer network with various workstations and a central server.

FIG. 1 illustrates a computer network in conjunction with which embodiments of the invention can be practiced. The description of FIG. 1 is intended to provide a general description of a suitable networked environment within which the invention can be implemented. This is a single, exemplary embodiment, and those skilled in the art will recognize that there are many variations to computer networks that the invention could be put to use in.

FIG. 1 shows a computer network 100. The computer network 100 has a bus 110 with which different nodes of the network are connected. In one embodiment, the bus 110 could be Ethernet cabling. Other possibilities could include fiber, twisted pair copper wire, or the Internet. In addition, the network could be comprised of wireless connections wherein the bus 110 becomes airwaves.

A plurality of different computer workstations 102 are connected to the bus 110. In this embodiment, these workstations include laptops and desktops (PCs). The computer workstations 102 are connected to the bus 110 in such a way as to allow for communication between the workstations 102, as well as communication to any node or device connected to the network. The computer workstations 102 can be comprised of a plurality of hardware and software configurations, including different operating systems.

A router 108 is connected to the bus 110. The router facilitates and directs network traffic to the appropriate node or nodes on the network. A centralized computer server 106 is connected to the bus 110 and is able to communicate bi-directionally with all nodes on the network, including the computer workstations 102. The centralized server 106 may have one of a plurality of operating systems.

Figure 2:
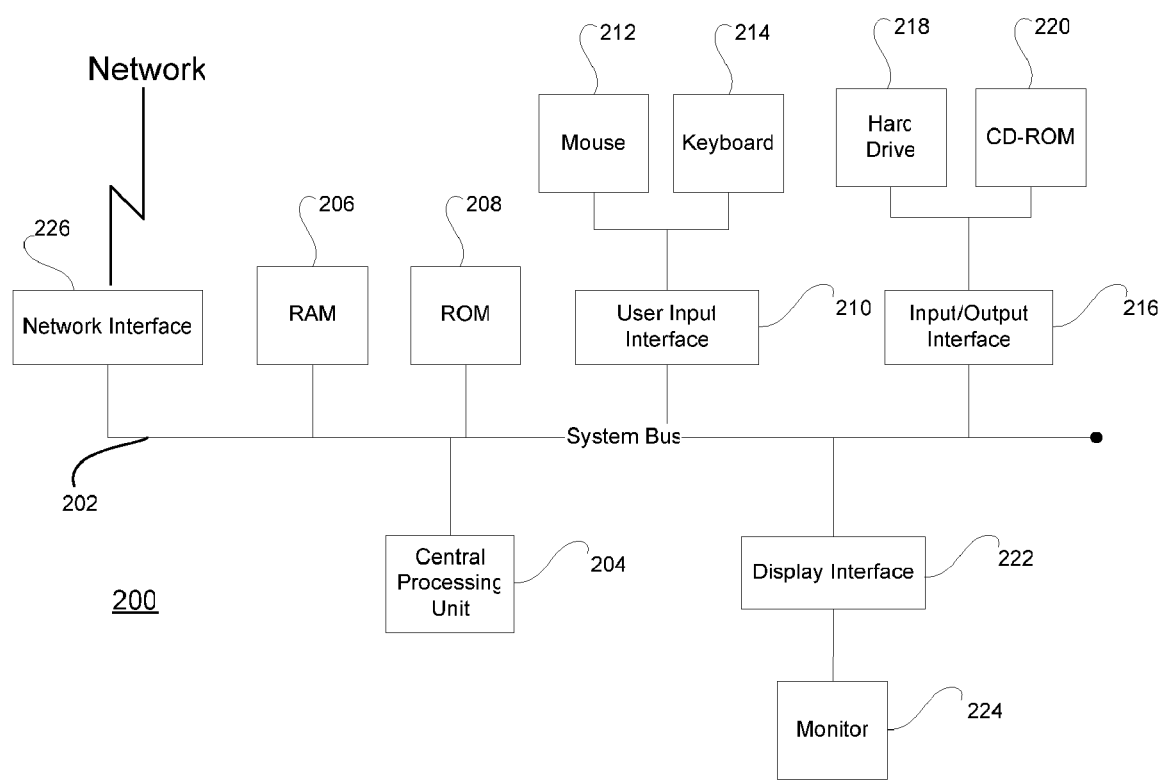
FIG. 2 is a block diagram that illustrates the hardware components that make up a computer workstation.

FIG. 2 illustrates the hardware components of a computer workstation. FIG. 2 is intended to provide a general description of suitable computer hardware within which an embodiment of the invention can operate. Those skilled in the art will understand that the invention can be practiced with other computer system hardware configurations.

FIG. 2 shows a general-purpose computer workstation 200. The computer workstation components are connected via a system bus 202 that allows for the various components to communicate. One component connected to the bus is a central processing unit (CPU) 204. The CPU 204 could be a single processing unit or it could be a grouping of more than one processing units. The invention is not limited to a specific number of processing units. Computer workstation 200 also includes random-access memory (RAM) 206, and read-only memory (ROM) 208. RAM 206 serves to temporarily store (until the computer system is powered off) executable computer instructions and data. ROM 208 stores executable computer instructions and data that remain intact and usable through the entire life of the computer system.

Computer workstation 200 further includes a user input interface 210, input/output interface 216, display interface 222, and network interface 226. The user input interface 210 is connected to a computer mouse 212, and a computer keyboard 214, both of which are used to enter commands and information into the computer workstation 200. The user input interface 210 could also be connected to a variety of input devices, including computer pens, game controllers, microphones, scanners, or the like. The input/output interface is connected to a computer hard-drive 218 and a cd-rom drive 220. These devices are used to store computer programs and data. The input/output interface could also be connected to variety of media storage devices, including tape drives, digital video disks, memory cards, or the like. The display interface 222 is connected to a computer monitor 224. The computer monitor 224 is used to visually display information to a computer user. The display interface 222 could also be connected to a variety of display devices, including multiple computer monitors, a television, a printer, or the like. The network interface 226 is used to communicate bi-directionally with other nodes connected to a computer network. The network interface 226 may be a network interface card, a computer modem, or the like.

Figure 3:
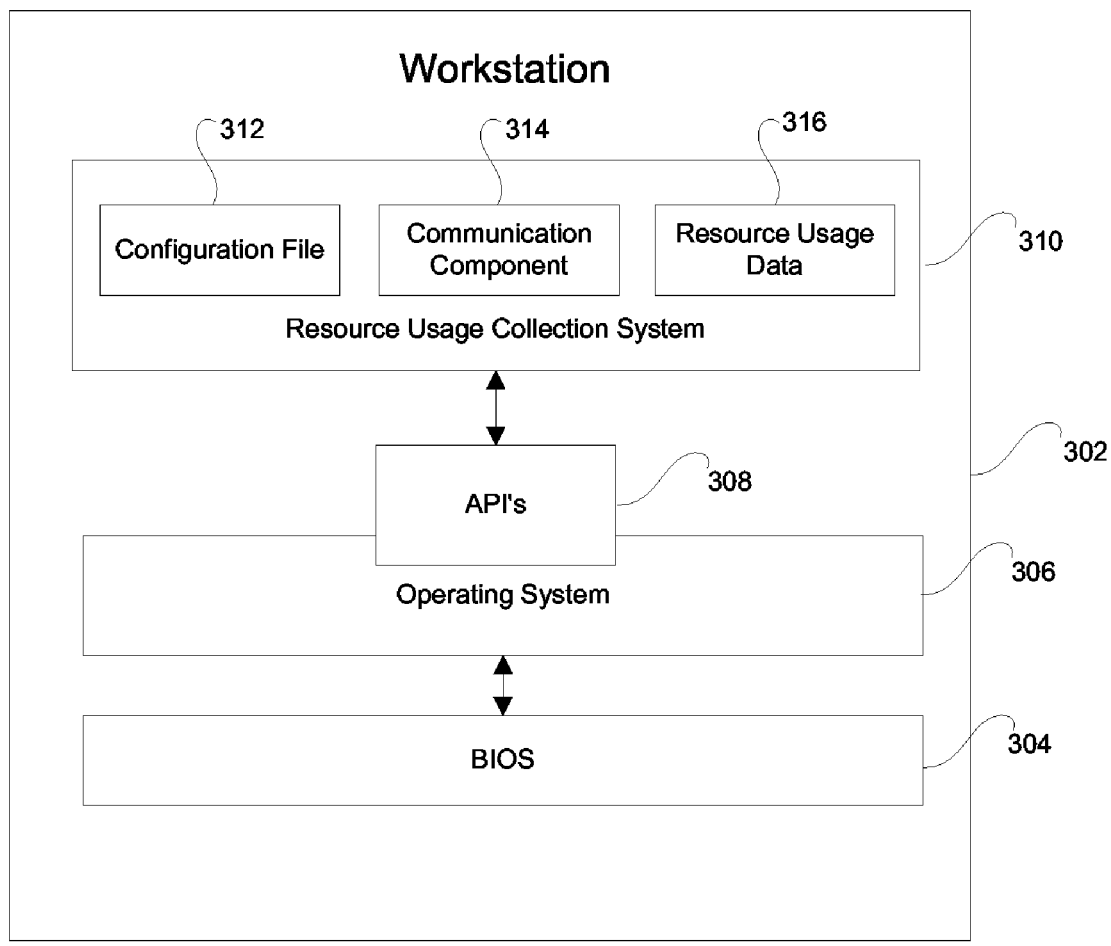
FIG. 3 is a block diagram that illustrates the software components that execute on a computer workstation within an exemplary embodiment of the invention.

FIG. 3 illustrates the software components 300 that execute on a computer workstation 302 within an exemplary embodiment of the invention. The basic input/output system (BIOS) 304 is software and data that is stored in ROM. The BIOS 304 consists of low-level basic routines for moving data between different hardware components on a computer workstation 302. The BIOS 304 also contains the machine executable instructions that run during start-up of the computer workstation 302.

The operating system 306 is a software layer (computer program) that sits on top of the BIOS 304. The operating system 306 manages the software and hardware on the computer workstation 302, often with interaction with the BIOS 304. One of the main functions of the operating system 306 is to run other software, and to manage the workstation resource usage of the various hardware components that make up the computer workstation 302. Operating system 306 may be one of many different available pieces of software, including Microsoft Windows™, UNIX, LINUX, OS/2™ or the like.

The operating system 306 exposes application programmer interfaces 308 (APIs). APIs 308 are methods or functions that allow other software to access functionality or data controlled by the operating system 306 or BIOS 304. Computer programs that are written to run on the operating system 306 use the APIs 308 for a variety reasons, including controlling peripherals, storing data, requesting CPU resources, and the like.

The resource usage collection system 310 (RUCS) is a set of computer programs and corresponding data files. RUCS 310 accesses the operating system 306 APIs 308 to collect and store data pertaining to the computer workstation's resource usage. Examples of resource usage include percent of the CPU being used, RAM usage, number of read/writes to the hard-drive, and the like. This data is collected and stored as resource usage data 316. The resource usage data 316 is stored in a format that can be parsed. This format may be in extensible markup language (XML), delimited, fixed position, or any format that allows for future parsing by another computer program.

The configuration file 312 is a file residing on the computer workstation 302. The configuration file 312 contains the instructions and parameters under which the RUCS 310 operates. The format of the configuration file 312 may be in XML, delimited, fixed position, or any format that allows for parsing by a computer program. Examples of the instructions and parameters contained in the configuration file 312 include what resource usage information the RUCS 310 should collect, when the RUCS 310 should attempt collection, how the RUCS 310 should communicate the data back to a centralized server, and the like.

The communication component 314 is a computer program that transmits the resource usage data 316 to a centralized server. In an exemplary embodiment of the invention, the communication component 314 is capable of transmitting the resource usage data 316 through a variety of different protocols, including hypertext transfer protocol (HTTP), transmission control protocol (TCP), internet protocol (IP), synchronous mail transfer protocol (SMTP), or any like protocol that supports data transmission from one computer system to another. In an exemplary embodiment of the invention, the communication component 314 is capable of transmitting the resource usage data 316 over a variety of different networks, including the Internet, local area networks (LANs), wide area networks (WANs), wireless networks, and the like.

Figure 4:
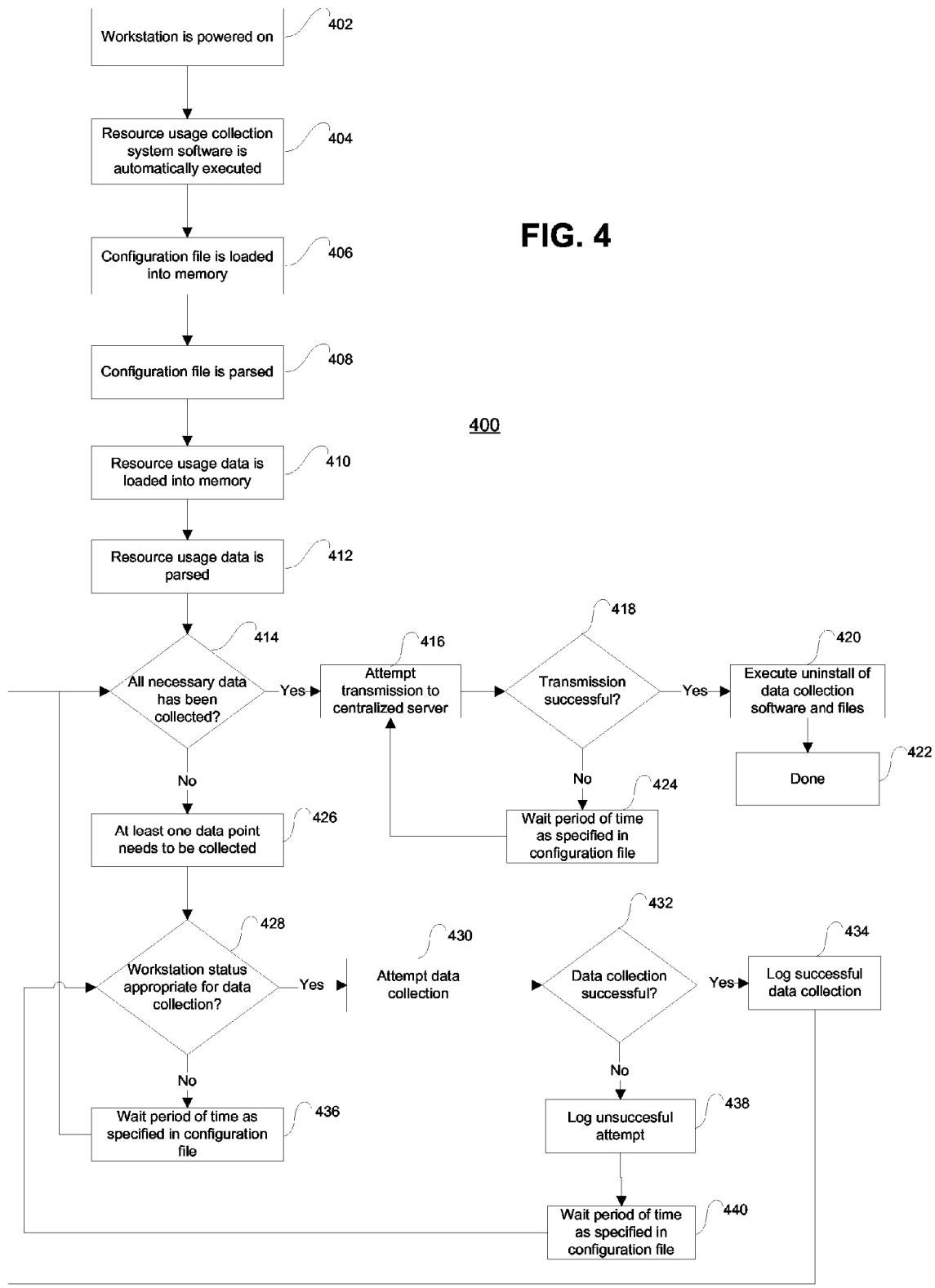
FIG. 4 is a flowchart illustrating the process for collecting resource usage and transmitting it to a centralized server in an exemplary embodiment of the invention.

FIG. 4 is a flowchart 400 illustrating the process for collecting resource usage from a computer workstation and transmitting it to a centralized server in an exemplary embodiment of the invention. The process starts at step 402 when the computer workstation is powered on. As part of the normal initialization routines executed after being powered on, the computer workstation loads the operating system. The operating system loads and executes the RUCS 310 in step 404 without any user intervention.

In step 406, the RUCS 310 then loads the configuration file 312 into random-access memory. In preparation for use of individual or group pieces of data in the configuration file 312, the configuration file 312 is then parsed in step 408. The resource usage data 316 is then loaded into random-access memory during step 410. Note that both the configuration file 312 and the resource usage data 316 are loaded into random-access memory in an exemplary embodiment of the invention. However, those skilled in the art will understand that both the configuration file 312 and resource usage data 316 could remain on the computer workstation hard-drive, or any other appropriate media, and be accessed as needed. In step 412, the resource usage data 316 is parsed.

Flow then passes to step 414 where the parsed resource usage data 316 is examined to determine if additional resource usage data collection is needed. If it is determined in step 414 that no additional resource usage collection needs to be performed, flow then passes to step 416. In step 416, an attempt is made to transmit the resource usage data 316 to the centralized server 106. Transmission of resource usage data 316 in step 416 is performed by the communication component 314. Which method to use to transmit the data in step 416 from computer workstation 302 to the centralized server 106 is determined from a piece of data contained in the configuration file 312. In an exemplary embodiment of the invention, the transmission is performed by using the HTTP protocol over a LAN.

In step 418, it is determined if transmission of the resource usage data 316 from the computer workstation 302 to the centralized server 103 is successful. If transmission is successful, flow moves to step 420. Step 420 executes instructions to un-install (delete) all files and executables pertaining to RUCS 310. In an exemplary embodiment of the invention, this includes removing the resource usage data 316, configuration file 312, and communication component 314. After executing step 420, operation of flowchart 400 is complete as indicated by moving to step 422.

If in step 418 it is determined that the transmission of resource usage data 316 is not successful, flow moves to step 424. In step 424, operations of the flowchart are stopped for a specific time duration, which is determined from a piece of data contained in the configuration file 312. This allows for possible communication problems to be solved before attempting re-transmission of resource usage data 316. After the specified amount of time has elapsed in step 424, flow then passes back to step 416.

If in step 414 it is determined that additional resource usage data collection needs to take place, flow passes to step 426. Step 426 indicates that at least one additional piece of resource usage data 316 needs to be collected. Flow then passes to step 428.

In step 428, a check is done to determine if the current state of the computer workstation 302 allows for resource usage data collection. If in step 428 it is determined that the computer workstation 302 is not in a state for valid resource usage data collection to occur, then flow passes to step 436. In step 436, operations of the flowchart are stopped for a specific time duration, which is determined from a piece of data contained in the configuration file 312. This allows for the computer workstation 302 to possibly move to a valid state before attempting resource usage data collection. After the specified amount of time has elapsed in step 436, flow then passes back to step 428.

If in step 428 it is determined that the computer workstation 302 is in a valid state for resource usage data collection to occur, flow then passes to step 430. In step 430, an attempt is made to collect the resource usage data. Flow then passes to step 432 where it is determined if resource usage data collection successfully occurred.

If in step 432 it is determined that resource usage data collection is successful, the flow then moves to step 434. In step 434, the resource usage data collected in step 430 is added to the resource usage data 316. Flow then passes back to step 414.

If in step 432 it is determined that resource usage data collection is not successful, flow passes to step 438. In step 438, the unsuccessful attempt to collect the resource usage data is logged. In an exemplary embodiment of the invention, the logging of unsuccessful attempts at resource usage data collection is performed by adding this information to the resource usage data 316. After step 438, flow then passes to step 440. In step 440, operations of the flowchart are stopped for a specific time duration, which is determined from a piece of data contained in the configuration file 312. This allows for the computer workstation 302 to possibly move into a state where resource usage data collection is successful. After the specified amount of time has elapsed in step 440, flow then passes back to step 428.

Figure 5:
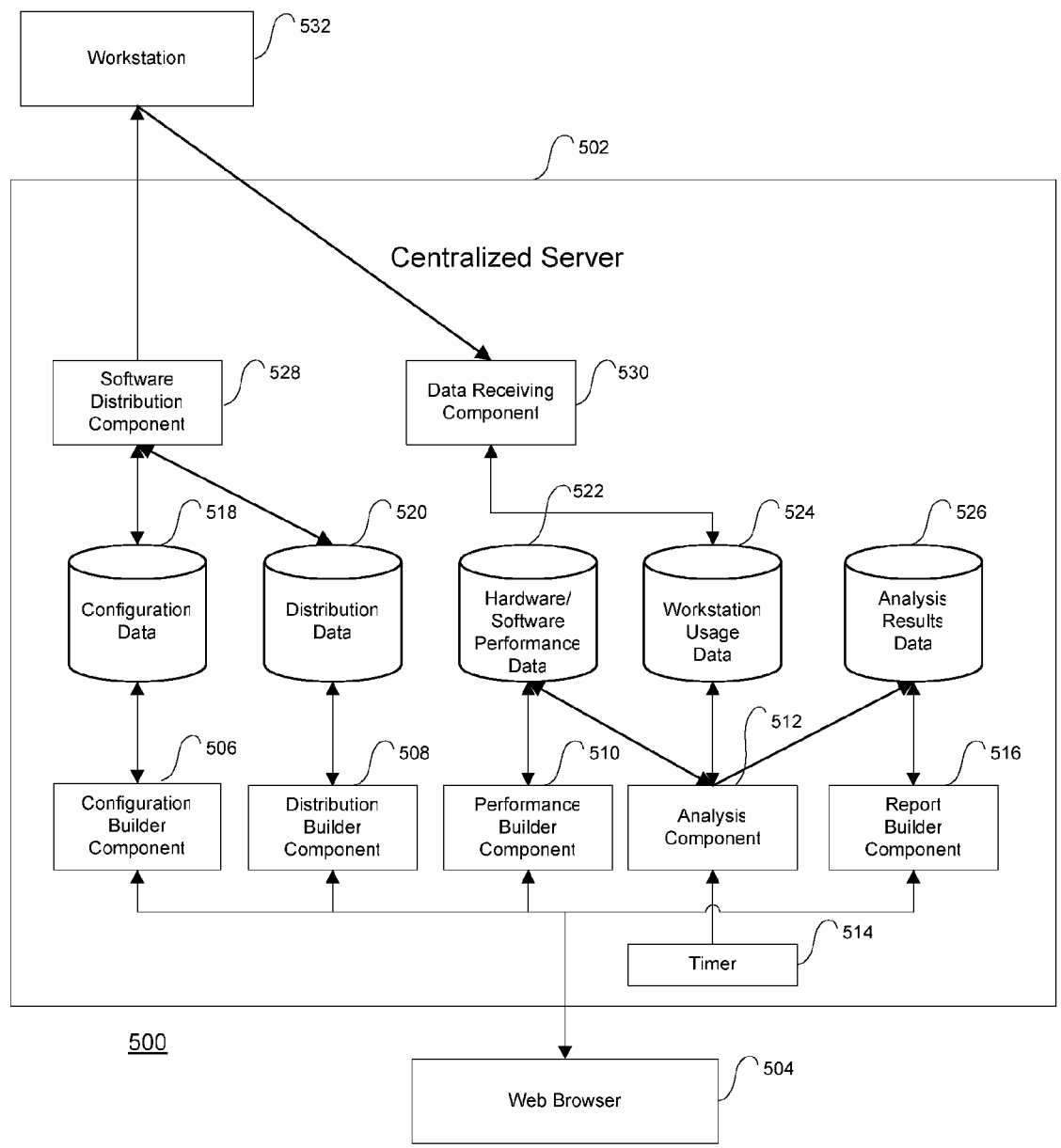
FIG. 5 is a block diagram that illustrates the software components that execute on a centralized server within an exemplary embodiment of the invention.

FIG. 5 is a block diagram 500 that illustrates the software components that execute on a centralized server 502 within an exemplary embodiment of the invention. The centralized server 502 is a computer that contains a variety of software components and data. A web browser 504 is used to display data and information through interactions with many of the software components. Those skilled in the art will recognize that computer software other than a web browser may be used for viewing of data and interaction with the software components residing on centralized server 502.

In an exemplary embodiment of the invention, the web browser 504 presents a visual interface for a user to build the configuration file 312. Configuration builder component 506 is software that controls the format, storage, and initial status of configuration data 518. Configuration data 518 is stored in such a way that it can be easily searched, retrieved, updated, deleted, and inserted. In an exemplary embodiment of the invention, configuration data 518 is stored in a database.

In an exemplary embodiment of the invention, the web browser 504 presents a visual interface for a user to build and manage distribution data 520. Distribution builder component 508 is software that manages the format, storage, and initial status of distribution data 520. Distribution data 520 is stored in such a way that it can be easily searched, retrieved, updated, deleted, and inserted. In an exemplary embodiment of the invention, distribution data 520 is stored in a database. Examples of pieces of distribution data are destination machine name, destination machine internet protocol address, distribution status, and the like.

The software distribution component 528 is software that transmits data from the centralized server 502 in a bi-directional manner to computer workstation 532. Software distribution component 528 transmits configuration data 518 and RUCS 312 software to workstation 532 based on the distribution data 520. In an exemplary embodiment of the invention, software distribution component 528 is used to transmit data to a plurality of computer workstations with a variety of different operating systems.

In an exemplary embodiment of the invention, the web browser 504 presents a visual interface for a user to manage hardware/software performance data 522. Performance builder component 510 is software that controls the format, storage, and status of hardware/software performance data 522. Hardware/software performance data 522 is stored in such a way that it can be easily searched, retrieved, updated, deleted, and inserted. In an exemplary embodiment of the invention, hardware/software performance data 522 is stored in a database. Examples of pieces of hardware/software performance data 522 are benchmarked CPU usage data for a plurality of hardware/operating system combinations, memory constraints for a plurality of hardware/operating system combinations, and the like. In an exemplary embodiment of the invention, performance builder component 510 can manage hardware/software performance data 522 both entered through web browser 504 and through a grouping of the data in a variety of different formats including XML, delimited file, fixed position, or any format that can be parsed by a computer program.

Timer 514 is a computer program that periodically executes based on a configurable schedule. In an exemplary embodiment of the invention, Timer 514 loads the analysis component 512 into RAM. The analysis component 512 retrieves hardware/software performance data 522 and workstation usage data 524. Analysis component 512 writes data to analysis results data 526. In an exemplary embodiment of the invention, workstation usage data 524 is stored in a database. Also in an exemplary embodiment of the invention, analysis results data 526 is stored in a database.

In an exemplary embodiment of the invention, the web browser 504 presents a visual interface for a user to view reports. Reports are generated from the web browser 504 interacting with the report builder component 516. The report builder component 516 reads analysis results data 526 and formats the information into reports that are viewable through web browser 504. Types of reports in an exemplary embodiment of the invention include a "workstations to fully upgrade" report, workstations needing component upgrades and workstations that do not need to be upgraded.

Data receiving component 530 is computer software that receives resource usage data 316 from computer workstation 532. Data receiving component 530 parses and formats resource usage data 316 and aggregates it into workstation usage data 524. In an exemplary embodiment of the invention, the data receiving component 530 is capable of receiving the resource usage data 316 through a variety of different protocols, including hypertext transfer protocol (HTTP), transmission control protocol (TCP), internet protocol (IP), synchronous mail transfer protocol (SMTP), or any like protocol that supports data transmission from one computer system to another. In an exemplary embodiment of the invention, the data receiving component 530 is capable of receiving the resource usage data 316 over a variety of different networks, including the Internet, local area networks (LANs), wide area networks (WANs), wireless networks, and the like.

Figure 6:
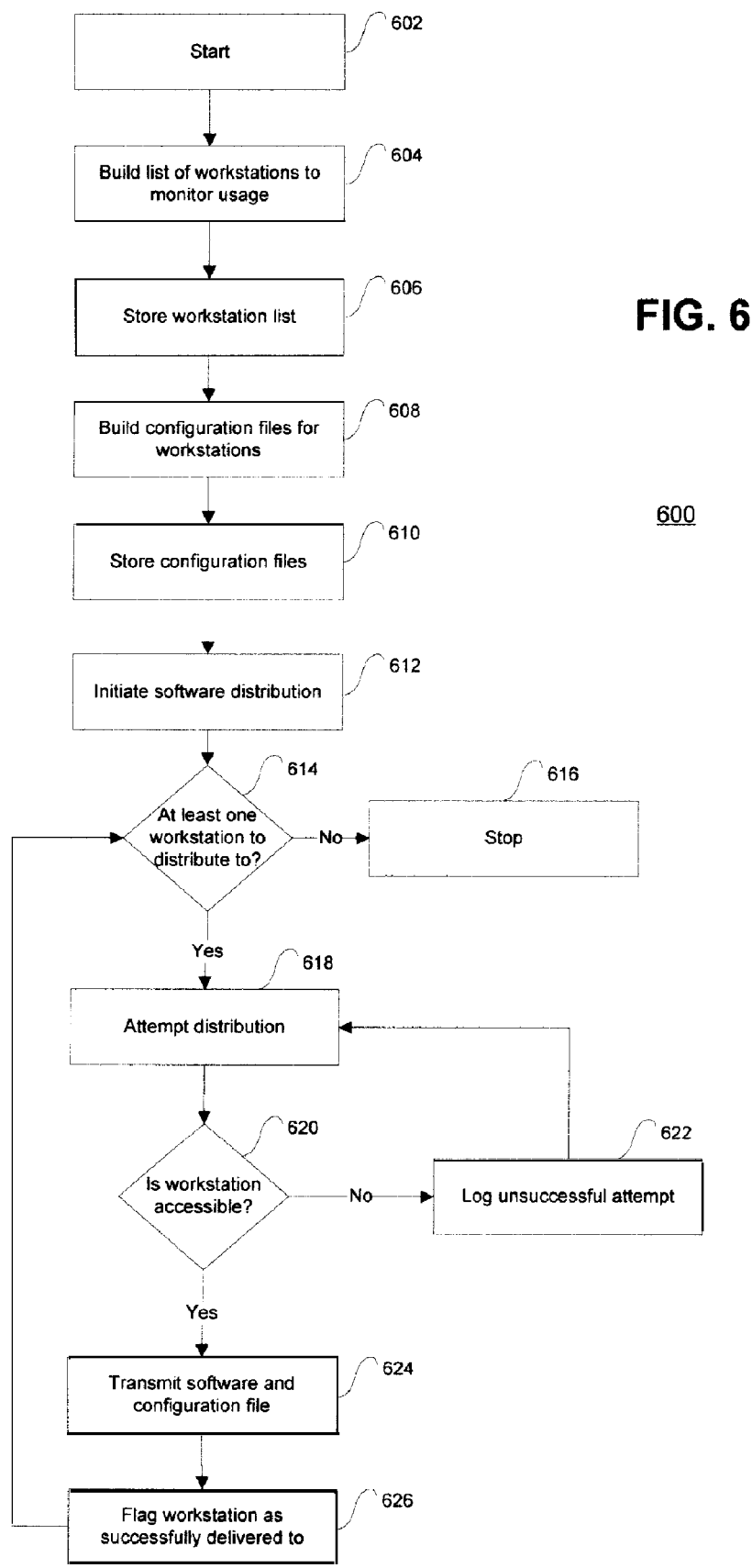
FIG. 6 is a flowchart illustrating the process for software and configuration data distribution from a centralized server to computer workstations in an exemplary embodiment of the invention.

FIG. 6 is a flowchart 600 illustrating the process for software and configuration data distribution from a centralized server to computer workstations in an exemplary embodiment of the invention. Operation of flowchart 600 begins at step 602 with control immediately passing to 604.

In step 604, a distribution list of computer workstations to monitor usage of is built. This is done through web browser 504 interacting with distribution builder component 508. Flow then passes to step 606, where the distribution list is stored as distribution data 520. Step 608 is then executed, which builds the configuration files for use on each computer workstation contained in the distribution data 520. The configuration files are created through the web browser 504 interacting with configuration builder component 506. Flow then passes to step 610, where the configuration builder component 506 stores the configuration files as configuration data 518.

Flow then passes to step 612, where software distribution is initiated. To initiate software distribution, a distribution list status is changed to a ready state by a user through web browser 504 interacting with the distribution builder component 508. Then, in step 614, a check is performed to determine if there is at least one computer workstation to distribute to. This step is performed by the software distribution component 528 examining the configuration data 518 and the distribution data 520. If there are no workstations to distribute too, flow passes to step 616, which is the end of the process.

If it is determined in step 614 that there is at least one computer workstation to distribute to, flow then passes to step 618. In step 618, distribution of RUCS 310 to a computer workstation is attempted through software distribution component 528. Flow passes to step 620, where software distribution component 528 determines if a workstation is accessible for RUCS 310 software distribution to take place. If in step 620 software distribution component 528 determines that RUCS 310 cannot be delivered to a computer workstation, flow passes to step 622. In step 622, the unsuccessful attempt at RUCS 310 software distribution is logged by software distribution component 528. Flow then passes to step 618.

If in step 620 software distribution component 528 determines that a computer workstation is accessible, flow passes to step 624. In step 624, RUCS 310 is transmitted to the workstation through software distribution component 528. Flow then passes to step 626 where software distribution component 528 changes the status of the workstation in distribution data 520 to a state indicating successful delivery. Flow then passes to step 614.

Figure 7:
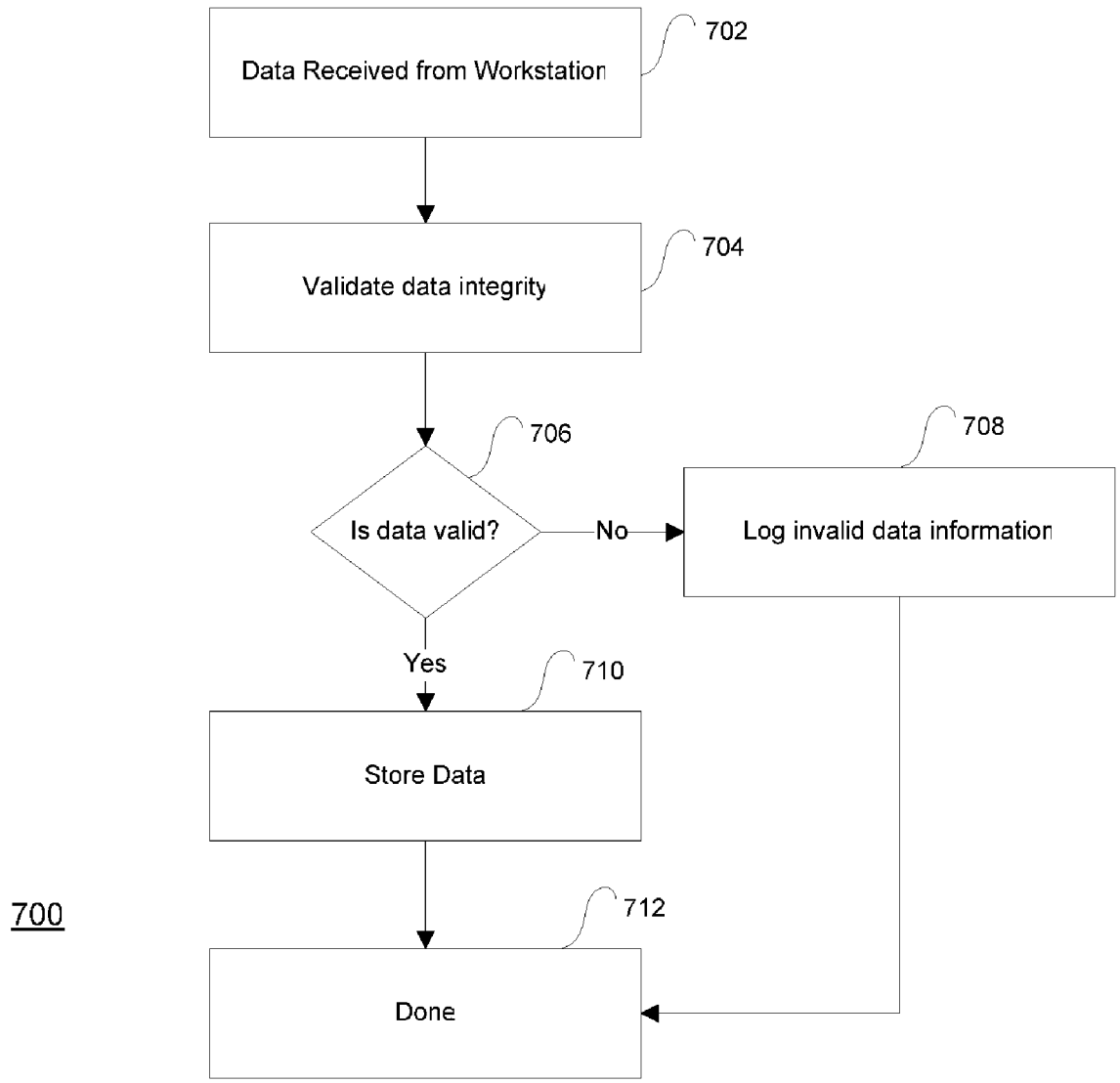
FIG. 7 is a flowchart illustrating the process of the centralized server receiving workstation usage data in an exemplary embodiment of the invention.

FIG. 7 is a flowchart 700 illustrating the process of the centralized server receiving resource usage data 316 in an exemplary embodiment of the invention. Operation of flow chart 700 begins at step 702. In step 702, data receiving component 530 receives resource usage data 316 from a computer workstation. Flow then passes to step 704 where data receiving component 530 performs validation of resource usage data 316. Flow then passes to step 706.

In step 706, if data receiving component 530 determines that resource usage data 316 is not valid, flow passes to step 708. In step 708, data receiving component 530 logs the invalid resource usage data 316 and passes flow to the end of the process, step 712.

If in step 706 the data receiving component 530 determines that resource usage data 316 is valid, flow passes to step 710. In step 710, data receiving component 530 parses, aggregates, and stores the resource usage data 316 as workstation usage data 524. Flow then passes to step 712, which is the end of the process.

Figure 8:
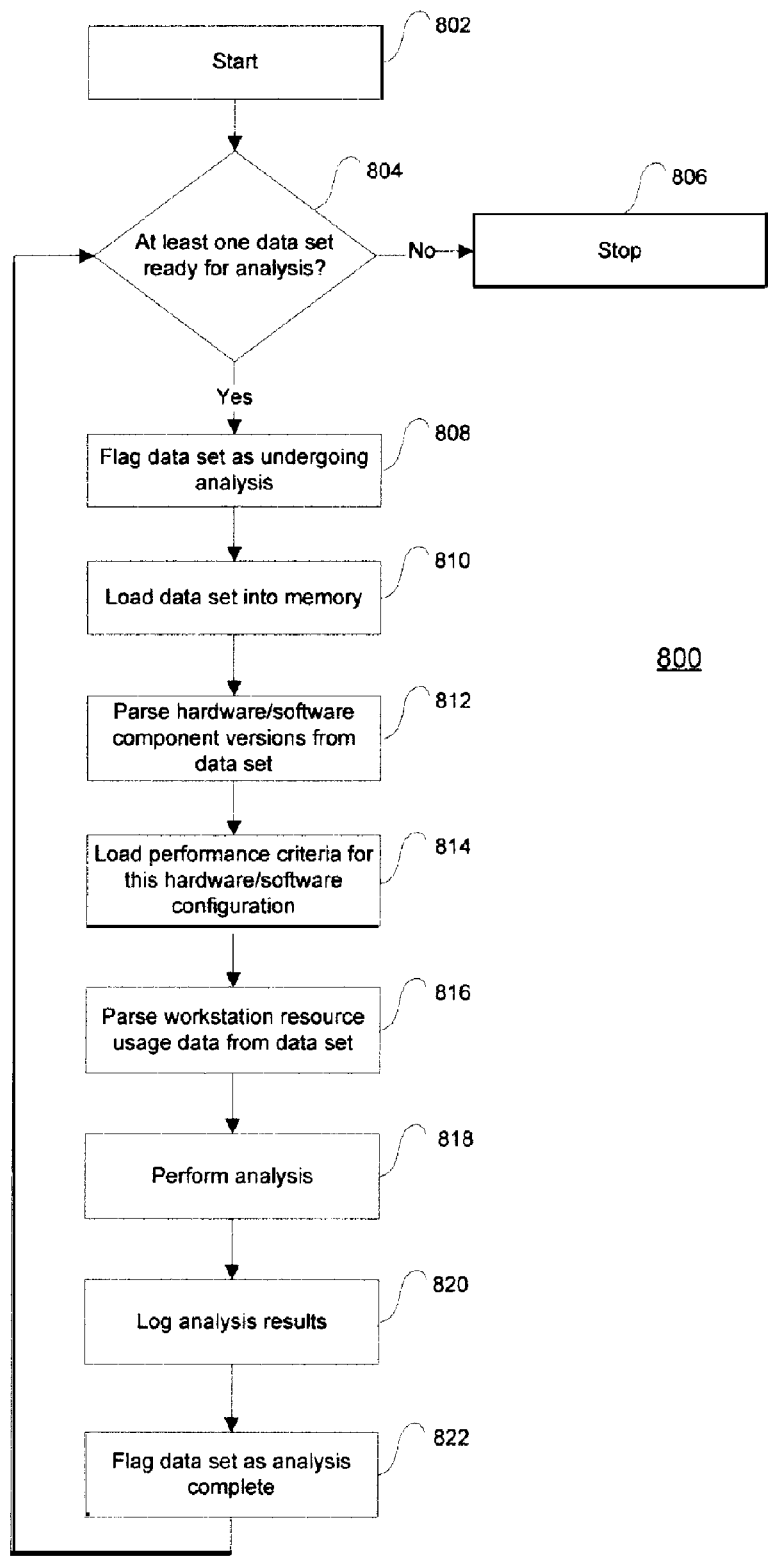
FIG. 8 is a flowchart illustrating the process of analyzing computer workstation resource usage data in an exemplary embodiment of the invention.

FIG. 8 is a flowchart 800 illustrating the process of analyzing workstation usage data 524 in an exemplary embodiment of the invention. Operation of flowchart 800 starts by being initiated by timer 614. Timer 614 is a computer program that loads and executes analysis component 512. Control of flowchart 800 immediately passes to step 804.

In step 804 analysis component 512 loads and parses workstation usage data 524. If analysis component 512 determines that there is no data set within workstation usage data 524 that needs analysis, then flow passes to step 806. Step 806 is the end of the process.

If in step 804 analysis component 512 determines that there is at least one data set in workstation usage data 524 that requires analysis, flow passes to step 808. In step 808, the analysis component 512 updates the state of the data set within workstation usage data 524 as undergoing analysis. Flow then passes to step 810.

In step 810, analysis component 512 loads the data set that requires analysis from workstation usage data 524. Flow then passes to step 812. In step 812, analysis component 512 parses the hardware/software component versions from the data set loaded in step 810. The hardware/software component versions is data originating from the workstation that indicates the types and amounts of hardware components (CPU, RAM, hard-disk storage, and the like), as well as the type and version of the operating system executing on the computer workstation. Flow then passes to step 814.

In step 814, analysis component 512 loads hardware/software performance data 522 that pertains to the hardware/software component versions parsed in step 812. Flow then passes to step 816. In step 816, resource usage data is parsed from the data set loaded in step 810. Flow then passes to step 818.

In step 818, the analysis component 512 performs analysis on the resource usage data parsed in step 816. The resource usage data is compared to acceptable parameters in the performance data loaded in step 814. Analysis component 512 makes determination on whether the data set loaded in step 810 constitutes a need to upgrade the computer workstation, upgrade a single or multiple hardware/software components of the workstation, or that no upgrade is necessary. Flow then passes to step 820.

In step 820, analysis component 512 logs the analysis results from step 818 to analysis results data 526. Flow then passes to step 822. In step 822, the state of the data set loaded in step 810 is changed to indicate analysis complete in workstation usage data 524. Flow then passes to step 804.

Figure 9:
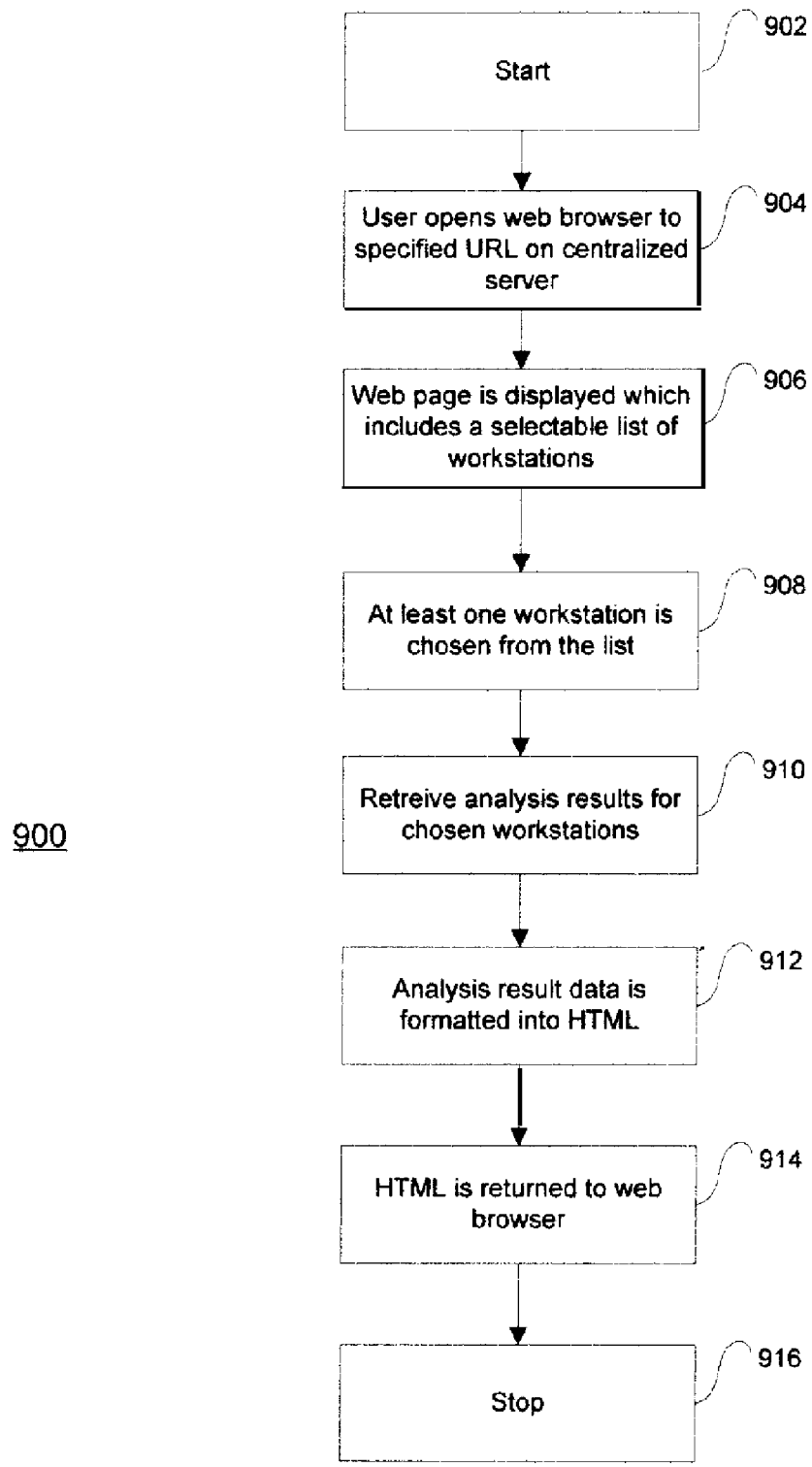
FIG. 9 is a flowchart illustrating the process of displaying analysis results in an exemplary embodiment of the invention.

FIG. 9 is a flowchart 900 illustrating the process of displaying analysis results in an exemplary embodiment of the invention. Operation of flowchart 900 begins at step 902 with control immediately passing to 904.

In step 904, web browser 504 is directed at a specific uniform resource indicator on centralized server 502. Flow then passes to step 906. In step 906, web browser 504 interacts with report builder component 516, and a formatted display of workstations for which partial or full analysis has been done is displayed in web browser 504. Flow then passes to step 908.

In step 908, the user, using web browser 504, selects at least one computer workstation to view a report on. Flow then passes to step 910. In step 910, analysis results data 526 is retrieved for all computer workstations selected in step 908. This is done through the web browser 504 interacting with report builder component 516. Flow then passes to step 912.

In step 912, report builder component 516 interprets and formats the analysis results data 526 from step 910 into HTML format. Those skilled in the art will understand that the format returned from report builder component 516 in step 912 could be any machine-readable format.

Flow then passes to step 914. In step 914, report builder component 516 transmits the HTML formatted report to web browser 504. Web browser 504 displays the report to the user. Flow then stops by moving to step 916.

What is claimed is:

1. A system for collecting and analyzing hardware and software resource usage data from a plurality of computer workstations, comprising:

a set of configurable computer software components running under control of the operating system on each of the said plurality of computer workstations, wherein each said set of configurable computer software components executes resource usage collection commands native to said operating system, collects said resource usage data, collects software and hardware component version data, and transmits said resource usage data and said version data to a centralized computer system;

a set of computer software components and data storage components running under control of the operating system of said centralized computer system, wherein said resource usage data is received, aggregated, stored, cleansed, and analyzed; a set of computer software components and data storage components running under control of said operating system of said centralized computer system, wherein computer software and configuration files are transmitted to said plurality of computer workstations;

wherein analyzing said hardware and software resource usage data is comprised of
comparing individual hardware and software component usage with known limits;
calculating resource usage values relative to capacity of each said hardware and software component;
generating an upgrade decision for each said hardware and software component;
calculating the aggregate resource usage value of aggregated hardware and software components;
generating an upgrade decision for said aggregated hardware and software components;
a set of computer software components and data storage components wherein a graphical interface is presented to build said configuration files, build a distribution list, add software and hardware performance data, and generate and view analysis results reports.

2. The system according to claim 1, wherein said software and hardware component version data comprise:
the manufacturer of hardware and software components, build version of hardware and software components, capacity of hardware components, and execution speed of hardware components.

3. The system according to claim 1, wherein said resource usage data comprise:
point in time resource utilization values for a plurality of hardware and software components.

4. The system according to claim 1, wherein said software and hardware performance data comprise:
historical maximum threshold limits of software and hardware components for a plurality of hardware and software configurations.

5. A method for collecting and analyzing hardware and software resource usage data from a plurality of computer workstations, comprising:
creating a list of said plurality of computer workstations to monitor usage of;
creating configuration files for each computer workstation on said list;
distributing resource usage monitoring software and said configuration files to each said computer workstation on said list;
wherein analyzing said hardware and software resource usage data is comprised of
comparing individual hardware and software component usage with known limits;
calculating resource usage values relative to capacity of each said hardware and software component;
generating an upgrade decision for each said hardware and software component;
calculating the aggregate resource usage value of aggregated hardware and software components;
generating an upgrade decision for said aggregated hardware and software components;
executing said resource usage monitoring software on each said computer workstation on said list;
collecting said resource usage data from output of said resource usage monitoring software on each said computer workstation on said list;
transmitting said resource usage data from each said computer workstation on said list to a centralized server;
analyzing said resource usage data on said centralized server; viewing analysis results and determining if an upgrade of hardware or software is required for each said computer workstation on said list.

6. the method of claim 5 wherein distribution of said resource usage monitoring software and said configuration files to said plurality of computer workstations is comprised of:
creating and storing a computer workstation distribution list through a web browser graphical user interface;
creating and storing said configuration files through a web browser graphical user interface;
transmitting of said resource usage monitoring software and said configuration files to said computer workstation distribution list;
storing transmission status of said resource usage monitoring software and said configuration files.

7. the method of claim 5 wherein collecting said hardware and software resource usage data from said computer workstation is comprised of:
executing resource usage collection software on startup of said computer workstation;
loading a configuration file into memory;
parsing said configuration file;
loading said hardware and software resource usage data into memory;
parsing said hardware and software resource usage data;
examining status of said computer workstation until ready for data collection;
collecting said hardware and software resource usage data;
logging of said hardware and software resource usage data.

* * * * *